Nov. 25, 1969 P. C. MICHAELIS 3,480,925
ASYNCHRONOUS MAGNETIC CIRCUIT
Filed May 19, 1967 2 Sheets-Sheet 1

INVENTOR
P. C. MICHAELIS
BY Herbert M. Shapiro
ATTORNEY

Nov. 25, 1969 P. C. MICHAELIS 3,480,925

ASYNCHRONOUS MAGNETIC CIRCUIT

Filed May 19, 1967 2 Sheets-Sheet 2

United States Patent Office 3,480,925
Patented Nov. 25, 1969

3,480,925
ASYNCHRONOUS MAGNETIC CIRCUIT

Paul C. Michaelis, Scotch Plains, N.J., assignor to Bell Telephone Laboratories, Incorporated, Murray Hill and Berkeley Heights, N.J., a corporation of New York Filed May 19, 1967, Ser. No. 639,831
Int. Cl. G11b 5/00
U.S. Cl. 340—174 11 Claims

ABSTRACT OF THE DISCLOSURE

Single wall reverse-magnetized domains have been found to repel one another as do like charged pith balls. This property enables a sequence of domains, introduced at an input position, to be moved through a medium to a gate position at which the passage of the foremost domain of the sequence is selectively inhibited. Next consecutive domains "queue up" on the foremost domain. The passage of the foremost domain and, subsequently, of next consecutive "foremost" domains, to a detector adjacent the gate position is controlled by the gate at any arbitrary rate different from the rate at which the domains are introduced. A simple asynchronous circuit is provided.

FIELD OF THE INVENTION

This invention relates to asynchronous shift register circuitry including a magnetic propagation medium in which information is represented in the form of single wall domains.

BACKGROUND OF THE INVENTION

A shift register is a multistage device typically comprising a bistable device in each stage. Numerical information is stored in a shift register in binary form wherein one state of a bistable device represents the storage of a "one" and the other state represents the storage of a "zero."

The bistable devices of a shift register are so interconnected that binary information can be inserted into the register and advanced from one bistable device to the next consecutive bistable device by the application of advance signals applied to all the bistable devices in the register. The particular state to which a bistable device is set in response to an advance signal is reflective of the state from which the next preceding bistable device is concurrently switched. At least three advance phases are customary to insure that information moves in a proper direction through the register. The register operates to advance information from an input to an output position in this manner. It is well known that, normally, the input and the output rates are the same and that considerable additional circuitry is necessary to permit asynchronous (different) input and output rates. The input as well as the output operation may be serial or in parallel.

An object of this invention is a new and novel asynchronous shift register circuit.

My copending application Ser. No. 579,995, filed Sept. 16, 1966, discloses a shift register arrangement including, rather than interconnected bistable devices, a single, magnetically saturated propagation medium wherein information is represented as the presence and absence of a single wall reverse-magnetized domain in a particular position. The presence (and absence) of a domain is moved from position to position through the medium in response to fields in excess of a propagation threshold characteristic of the medium.

SUMMARY OF THE INVENTION

The present invention is based on the discovery that consecutive single wall domains advance from an input position in a magnetic sheet to a remote output position may be made to "queue up" on a single wall domain the advance of which is inhibited by a suitable field at a particular (gate) position short of the output position. Domains so queued do not pass to the output position for detection. Removal of the inhibit field permits passage of the domains at a rate completely independent of the input rate.

In one embodiment of this invention, single wall domains are generated at input positions in first and second essentially contiguous anisotropic magnetic sheets in response to first and second input signals. The domains in the first sheet are advanced along the hard axis of the sheet. The domains in the second sheet are similarly advanced along a corresponding axis in that sheet. A detector coupled to a remote position in the first sheet indicates the presence and absence of domains in that sheet representing binary ones and zeros, respectively. An additional D.C. winding coupling to the first and second sheets intermediate the input and the output positions normally generates a (D.C.) field to inhibit the passage of the foremost domain to the output position. The next consecutive domain, in either sheet, queues up on the foremost domain and so on. The controlled termination (gating) of the D.C. field permits passage of the domains to the output position.

Accordingly, a feature of an embodiment of this invention is an asynchronous magnetic circuit including first and second essentially contiguous magnetic sheets in a particular position in each of which the presence of a single wall domain represents a first and a second binary value respectively.

Another feature in accordance with this invention is an asynchronous circuit including means generating a sequence of single wall domains including a foremost domain and means controllably inhibiting the passage of the foremost domain short of an output position in a manner such that next subsequent domains queue up on the foremost domain.

DETAILED DESCRIPTION

Figure 1:
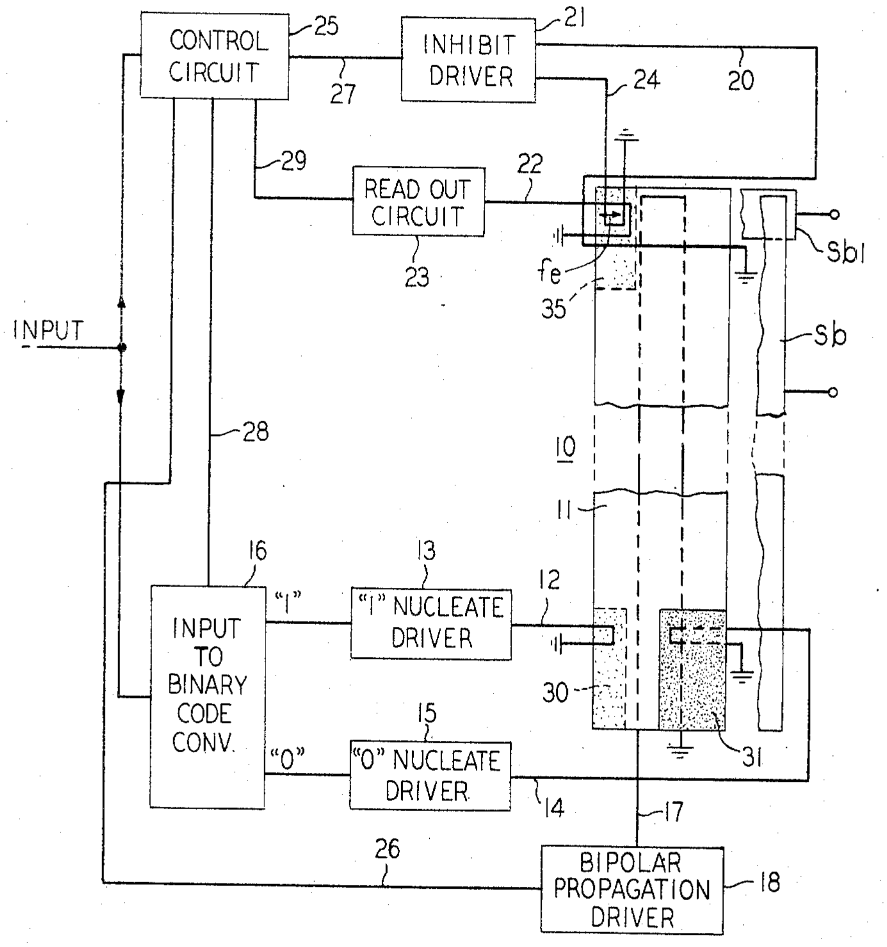
FIG. 1 is a schematic representation of an asynchronous shift register circuit in accordance with this invention.

FIG. 1 shows an illustrative asynchronous shift register circuit 10 in accordance with this invention. Circuit 10 includes first and second anisotropic magnetic sheets, conveniently of permalloy, represented by a block 11 in FIG. 1 and shown as sheets **11*a* and 11*b* in FIG. 2. Sheets 11*a* and 11*b*** are spaced apart by a thin electrically insulating film not shown.

Figure 2:
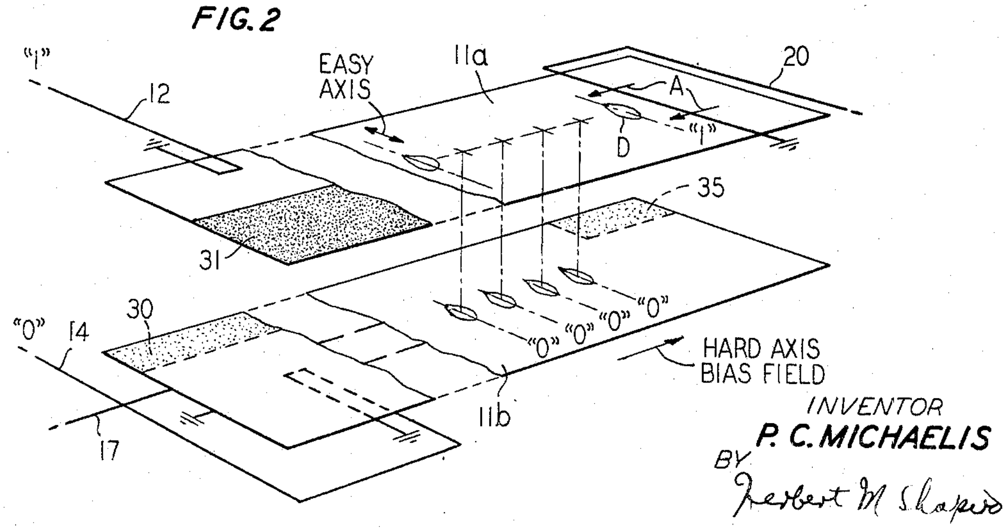
FIGS. 2, 3A, and 3B are schematic illustrations of portions of the circuit of FIG. 1 showing domain patterns therein.

A nucleate conductor 12 couples sheet **11*a* and is connected between a "1" nucleate driver 13 and ground as shown in FIGS. 1 and 2. Similarly, a conductor 14, coupled to sheet 11*b*, is connected between a "0" nucleate driver 15 and ground. Illustratively, conductors 12 and 14 couple corresponding but spaced apart input positions as will become clear hereinafter. Drivers 13 and 15 are connected to outputs to an input-to-binary code converter 16**.

A hairpin-shaped conductor 17, including a forward and a return path, couples both sheets 11*a* and 11*b* along an axis which coincides with the hard axis of the sheets as taught in my copending application already mentioned. Conductor 17 is connected between a bipolar propagation driver 18 and, via the return path, ground as shown in FIGS. 1 and 2. As is clear from FIG. 1, the forward path followed by conductor 17 lies intermediate the spaced apart input positions coupled by conductors 12 and 14.

A conductor 20 couples, illustratively, both sheets 11*a* and 11*b* in a manner to inhibit passage of a single wall domain in either sheet when a current flows therein. Conductor 20 is connected between an inhibit driver 21 and ground.

An output conductor 22 couples sheet 11*a* at an output position remote from the input position coupled by conductor 12 and spaced apart therefrom by the intermediate (gate) position coupled by conductor 20. Conductor 22 is connected between a readout circuit 23 and ground.

A conductor 24 also couples the output position following a path parallel to but spaced apart from the forward path of conductor 17. Conductor 24 is connected between inhibit driver 21 and ground.

Drivers 18 and 21, converter 16, and circuit 23 are connected to a control circuit 25 via conductors 26, 27, 28, and 29 respectively. The various drivers, circuits, and converters herein may be any such elements capable of operating in accordance with this invention.

The basic shift register in accordance with my aforementioned copending application operates to move a single wall domain along the forward path of an illustratively hairpin-shaped conductor oriented along the hard axis of the magnetic sheet. To this end, a hard direction bias field is necessary, as described in that application, and assumed present here, supplied conveniently via a solenoid designated S*b* in FIG. 1. Bipolar pulses applied to the hairpin conductor 17 generate alternating easy direction fields thereabout which, in the presence of the hard direction bias, advance single wall domains ideally one position per alternation. Importantly, the absence of a bias field or the absence of an easy axis field at any position inhibits the passage of a domain at that position. Conductor 20 is positioned to so inhibit the passage of domains to an output position coupled by conductor 22.

Figure 3A:
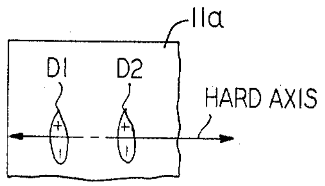
Figure 3B:
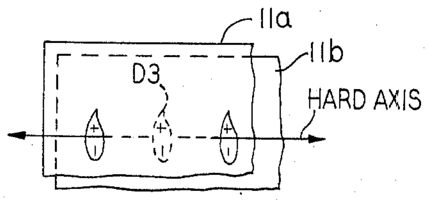

Next consecutive domains queue up on an inhibited foremost domain. A single wall domain as disclosed in detail in my aforementioned copending application has a charge distribution, along an easy axis orientation, represented by the spaced apart plus and minus signs in FIG. 3A. When such domains are propagated along the hard axis of the magnetic sheet (i.e., 11*a*) in which they are generated, the like signs align and the domains act to repel one another as is clear from FIG. 3A where next adjacent domains, D1 and D2, in a single sheet are shown. FIG. 3B shows two domains in a single sheet (i.e., 11*a*) spaced apart by a third domain D3 in a contiguous sheet (i.e., 11*b*). Again it is seen that like charges align to repel one another. The repulsion between next consecutive single wall domains leads to the queuing effect when the advance of a moremost domain is inhibited.

In order to take full advantage of the queuing property of consecutive single wall domains being advanced along a hard axis of an anisotropic medium, it is necessary to store binary ones and zeros as the presence of domains in first and second positions in first and second magnetic sheets as shown in FIG. 3B instead of representing information as the presence and absence of a domain in a first position in a first sheet. Otherwise, when the domains are queued, information represented by the absence of domains is lost. Essentially contiguous magnetic sheets support domains and, fortunately, domains in such contiguous sheets queue up on one another, as shown in FIG. 3B, in a manner to avoid such a loss of information when that information is represented in the former manner. Further, the presence of a domain in the second sheet corresponds to the absence of a domain in the first sheet. Consequently, although information is stored as the presence of a domain in first and second sheets, the information may be detected in terms of the presence and absence of domains in the first sheet.

FIG. 2 represents a single wall domain in sheets 11*a* and 11*b* as an eye-shaped area where the solid line thereabout represents the single domain wall. A domain in sheet 11*b* is taken to represent a zero and a domain in sheet 11*a* is taken to represent a one. The binary values represented in FIG. 2, accordingly, are 100001 reading from top to bottom as viewed in the figure.

A binary one (a domain in sheet 11*a*) is generated at the input position in sheet 11*a* by means of a pulse on conductor 12. Similarly, a binary zero is generated by a pulse on conductor 14. Such a pulse is, illustratively, sufficient to generate a field which exceeds the nucleation threshold of the magnetic sheets. To this end, sheets 11*a* and 11*b* may be of like material having like nucleation thresholds. In order to insure that domains are nucleated, for all practical purposes, only in the sheet desired in response to the information bearing input signals, those portions of sheets 11*b* and 11*a* adjacent the input portions of sheets 11*a* and 11*b*, respectively, in which domains are to be avoided have contiguous layers of aluminum or are abraded to raise the coercive force there. The areas so affected are shown cross-hatched in FIG. 2 and designated 30 and 31. It is clear then that a pulse on conductor 12 provides a domain only in sheet 11*a* because the adjacent portion of sheet 11*b* has a higher coercive force (and effective nucleation threshold). By the same token, a pulse in conductor 14 provides domains only in sheet 11*b*.

An input pulse in conductor 12 provides a domain in a position spaced apart along the easy axis of the material from that position in which a domain is provided by a pulse in conductor 14. It is necessary that such domains, representing ones and zeros, be consolidated to positions along the forward path of conductor 17 and the input operation functions to this end. My aforementioned application discloses movement of single wall domains along the easy axis of anisotropic sheets in response to a simple pulse program. If the initial positions for domains are thought of as occupying first and second positions spaced apart, along the easy axes of sheets 11*a* and 11*b*, by an intermediate position coinciding with the forward path of hairpin conductor 17, a simple pulse program moves such domains to the intermediate position. That program includes alternatively positive then negative fields generated at the initial domain input position, the negative field being concurrent with a positive field in the intermediate position. Since only one binary value is represented at the initial input position pair at one time, a domain first appears in the first or second input position to be moved to the intermediate position by the input operation. Remember, the first input position is in sheet 11*a* and the second input position is in sheet 11*b* while the intermediate position is an imaginary position in either sheet corresponding to the position of the forward path of conductor 17.

Figure 4:
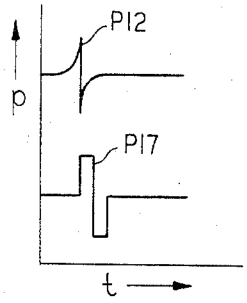
FIG. 4 is a pulse diagram of an input operation of the circuit of FIG. 1.

FIG. 4 shows a pulse diagram of the illustrative input operation. Consider a binary one being stored. A bipolar pulse P12 is applied to conductor 12 such that the positive cycle exceeds the nucleation threshold and a domain is provided. As the pulse P12 goes negative, the positive excursion of the required bipolar easy direction propagation pulse P17 on conductor 17 is applied. The domain is, accordingly, first displaced along the easy axis to the intermediate position and then propagated along the forward path of conductor 17 as described in my aforementioned application. A linear core operated below saturation conveniently provides the illustrative bipolar input pulse on conductor 12.

A similar input operation provides a binary zero representation. Single wall domains, accordingly, are generated in the appropriate sheets for propagation in a manner to represent a sequence of binary bits.

Inhibit driver 21 of FIG. 1 normally maintains a current in conductor 20 generating a localized field, represented by the arrows A in FIG. 2, to counter the assumed present hard direction bias field necessary for propagation. The foremost domain D shown in FIG. 2, accordingly, advances to the position of arrows A and stops. The queuing phenomenon permits next consecutive bits in either sheet 11*a* or 11*b* to queue up on the foremost bits in a manner to preserve the integrity of the information sequence while the bipolar currents on conductor 17 continue.

Additional domains may be generated in sheets 11*a* or 11*b* at any rate determined by the inputs to drivers 13 and 15 under the control of control circuit 25. Additional domains so generated immediately propagate along hairpin conductor 17, also under the control of control circuit 25, until they encounter the next preceding so-propagated domain. Each consecutive domain, then, queues up on the next preceding domain. Domains are advanced to an output position coupled by conductor 22 only when the current in conductor 20 is terminated. Typically, the current in conductor 20 is pulsed off under the control of a control signal from control circuit 25 permitting passage to the output position of that number of domains acceptable to the readout circuit usually a number corresponding to a binary word.

The readout of domains in sheet 11*a* may be by electrical or by optical means. If electrical means are employed, it is desirable to insure that only domains in sheet 11*a* are detected and not those in sheet 11*b*. In order to avoid detecting the latter, an aluminum layer is deposited on sheet 11*b* at the output position displaced, along the easy axis, from the forward path of conductor 17 as indicated by the broken block designated 35 in FIG. 1. Domains advanced in sheet 11*a* are displaced along the easy axis at the output position to a position encompassed by conductor 22 in a manner consistent with that discussed in connection with the input operation. Domains in sheet 11*b* cannot be so displaced because of the aluminum layer 35 contiguous therewith.

Conductor 24 of FIG. 1 cooperates with conductor 17 to effect the domain displacement along the easy axis at the output position. Such a conductor is conveniently operated, via a suitable delay, by inhibit driver 21 which may include, to this end, a flip-flop pulsing conductor 20 when set and for enabling conductor 24 to be appropriately pulsed when reset. The delay is to permit a foremost domain to advance to the output position after the inhibit field is gated. Operation of conductor 24 is entirely consistent with movement of single wall domains in the easy direction and not discussed further.

Optical readout operates by means of the rotation of the polarization vector of incident polarized light and the corresponding outputs are achieved without easy axis displacement of domains in sheet 11*a* as just described. If optical readout is employed, a polarized beam scans the output position of sheet 11*a* and read circuit 23 responds to properly reflected light to provide an output in accordance with well understood consideration.

In each instance, all that is required is that the magnetic medium be sufficiently long to store the representations of all the input information in the absence of a control signal permitting readout. Each domain read out is erased by an easy direction field poled opposite to the polarity of a domain. Such a field is represented by the arrow in FIG. 1 designated $f_e$ and is supplied conveniently by a magnet or by a winding not shown.

The hard direction bias field necessary for propagation of domains along a hard axis of a magnetic sheet in accordance with the illustrative embodiment is supplied conveniently by the solenoid S*b* which generates the bias field in response to a current therein as mentioned above. Further flexibility is provided in accordance with this invention if an additional solenoid is provided to generate an additional bias field at the output side of the inhibit position enabling an output propagation rate different, for example faster, than the input propagation rate. Such an additional solenoid is designated S*b*1 in FIG. 1.

In one specific example of operation in accordance with this invention, single wall domains having dimensions of 5 mils by 18 mils were formed at input positions of magnetic sheets three inches by one inch spaced apart by an aluminum oxide sheet 1000 A. thick. The sheets were 15/65/20 weight-percent FeNiCo 1600 A. thick. A hard direction bias of 3.8 oersteds was employed with 0.8 amp. by 0.7 microseconds ($\mu$s.) and −0.8 amp. by 0.3 $\mu$s. easy direction fields employed for propagation. Domain spacings of 16 mils were maintained. A field of 3.8 oersteds was used to inhibit passage of the domains to an output position. Consecutive domains provided at a one kilocycle rate were advanced in a manner to represent information as already described. The foremost domain was inhibited by a field pulsed off for 12.5 microseconds eighty times per second permitting the detection of three binary bits each time the field was pulsed. If the inhibit field is pulsed off for 4 microseconds, ten times per second, one binary bit is detected each time, a rate compatible with, for example, telephone central office equipment.

Asynchronous circuitry finds use in such familiar apparatus as multifrequency-to-dial pulse converters which adapt pushbutton telephones to central offices which respond only to dial pulse inputs. Converter circuits of this type generally operate with a parallel input of binary zeros and ones representative of a called decimal digit responsive to the depression of a pushbutton on a telephone subscriber subset. Such an input is compatible with the organization of the circuit of FIG. 1 operative upon converter 16 to generate the required arrangement of single wall domains in sheets 11*a* and 11*b* and to initiate propagation thereof under the control of control circuit 25. To this end, conductors 12 and 14 and drivers 13 and 15 may be considered representative of a parallel nucleate means responsive to the output of converter 16 to form the corresponding domain pattern. An arrangement of this type is disclosed in copending application Ser. No. 531,885 of J. L. Smith, filed Mar. 4, 1966.

In the last-mentioned application, information is represented by reverse-magnetized domains a characteristic distance apart. The information represented in FIG. 2 may be interpreted in this fashion.

Figure 5:
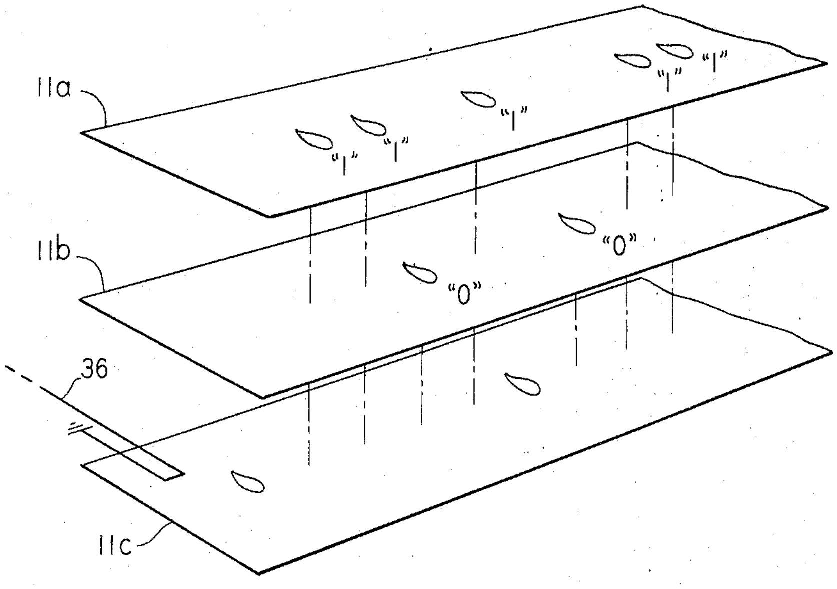
FIG. 5 is an exploded schematic view of a portion of an alternative arrangement in accordance with this invention.

Each decimal digit may be represented, then, by a coded arrangement of spaced apart "ones" (domains in sheet 11*a*). It is further required to distinguish between one decimal digit representation and the next. An additional sheet 11*c* of (like) magnetic material contiguous (to but insulated from) sheet 11*b* of FIG. 2 such as is shown in FIG. 5 provides an additional indication of the end of a digit representation. For example, each parallel representation of a decimal digit may be accompanied by a domain in sheet 11*c* which would include an input drive arrangement 36 similar to those shown in FIGS. 1 and 2 to this end. The input end of sheet 11*c* conveniently protrudes beyond sheets 11*a* and 11*b* to insure the provision of such an "end-of-digit" indication without nucleating spurious domains in sheets 11*a* and 11*b*. The domain in sheet 11*c* is advanced, as are those in the contiguous sheet, to provide the end-of-digit information as described in the aforementioned Smith application. The initial position of the end-of-digit domain, however, is spaced to permit the advance thereof along the hard axis of sheet 11*c* while binary zero and binary one representations are being consolidated from the initial spaced apart positions to consecutive positions along the forward path of conductor 17 of FIG. 1.

Figure 6:
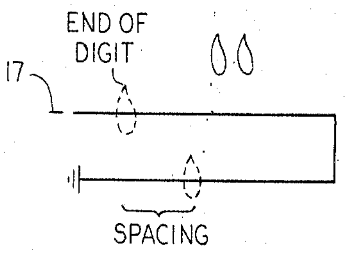
FIG. 6 shows an initial disposition of single wall domains representative of a decimal digit.

FIG. 5 shows an arrangement of domains reepresenting, in the usual binary coded fashion, a decimal three followed by a decimal thirteen reading from right to left. Such a representation is conveniently used alternative to the representation shown in FIG. 2. FIG. 6 shows the initial disposition of the domains representing the digit three along with the end of digit domain permitting a simple visualization of the parallel input operation.

When an additional magnetic sheet is employed, the distance between sheets is far less than the distance between adjacent domains.

What has been described is considered only illustrative of the principles of this invention. Accordingly, various modifications may be made therein by one skilled in the art without departing from the spirit and scope of the invention. For example, the principles of this invention are applicable to single wall domain arrangements as disclosed in copending application Ser. No. 579,931 filed Sept. 16, 1966 for A. H. Bobeck, U. F. Gianola, R. C. Sherwood, and W. Shockley. In that implementation, single wall domains are moved in a sheet which is isotropic in the plane of the sheet. Consequently, first and second adjacent domain propagation channels may be defined in a single sheet rather than first and second channels in first and second sheets as described above.

What is claimed is:

1. In combination, a magnetic medium in which single wall domains are advanced in response to propagation fields in excess of propagation threshold, said medium including input, intermediate, and output positions, said domains being characterized by like magnetic states and thus exhibiting repulsion forces therebetween, input means responsive to coded input signals for providing corresponding coded single wall domains in said input position, means coupled to said medium between said input and output positions for providing propagation fields for advancing single wall domains from said input to said output position, means coupled to said intermediate position responsive to a control signal concurrent with said propagating fields for selectively stalling the passage of the foremost one of said domains to said output position in a manner such that said repulsion forces cause next consecutive domains to queue up on one another, and means coupled to said output position for detecting only single wall domains which pass said intermediate position.

2. A combination in accordance with claim 1 wherein said magnetic medium comprises a sheet of anisotropic material and said input, intermediate and output positions are organized along the hard axis of the sheet.

3. A combination in accordance with claim 1 wherein said magnetic medium comprises first and second sheets of anisotropic magnetic material, and said means responsive to coded input signals generates domains in said first and second sheets representative of first and second binary values respectively, said domains in said first and second sheets being positioned in a manner to permit the queueing of the domains in one sheet on the domains of the other when said foremost domain is stalled.

4. A combination in accordance with claim 3 including a third anisotropic magnetic sheet.

5. A combination in accordance with claim 2 wherein said means for providing propagation fields comprises a conductor for generating alternating first and second easy direction fields between said input and output positions when pulsed.

6. A combination in accordance with claim 5 wherein said means for providing propagation fields also comprises a means for generating a first hard direction bias field between input and output positions.

7. A combination in accordance with claim 6 wherein said means for stalling passage of domains comprises means for generating at said intermediate position an inhibit hard direction field counter to said bias field.

8. A combination in accordance with claim 6 wherein said means for providing propagation fields also comprises means for generating a second hard direction bias field between said intermediate and output positions.

9. A combination in accordance with claim 6 wherein said input means comprises first and second input means comprising first and second input conductors coupled to said first and second sheets respectively at positions corresponding to one another along the hard axis of the sheets but spaced apart from one another along the easy axis.

10. A combination comprising a magnetic medium, means for generating a pattern of single wall domains including a foremost domain at an input position therein, said domains being characterized by like magnetic states and being disposed to repel one another, means for providing propagation fields for advancing domains from said input to an output position, means responsive to a control signal for inhibiting said propagation fields at a position intermediate said input and output positions while said fields are being provided in a manner to selectively stall without annihilating said foremost domain for preventing said foremost domain from reaching said output position thereby causing consecutive domains to queue up on one another.

11. In combination, a magnetic medium in which single wall domains are advanced in response to propagation fields, said medium including input, intermediate, and output positions, said domains being characterized by like magnetic states and being disposed to repel one another, input means for providing single wall domains in said input position, means for providing propagation fields for advancing single wall domains synchronously from said input to said output position, and means for selectively stalling the passage of the foremost one of said domains to said output position in a manner such that consecutive domains queue up on one another.

References Cited

UNITED STATES PATENTS 3,114,898 12/1963 Fuller -------------- 340—174

STANLEY M. URYNOWICZ, Primary Examiner

G. M. HOFFMAN, Assistant Examiner